United States Patent [19]

Fogelberg

[11] 4,119,168

[45] Oct. 10, 1978

[54] AUTOMATIC FOUR-WHEEL DRIVE TRANSFER CASE

[75] Inventor: Mark John Fogelberg, Muncie, Ind.

[73] Assignee: Borg-Warner Corporation, Chicago, Ill.

[21] Appl. No.: 750,496

[22] Filed: Dec. 14, 1976

Related U.S. Application Data

[63] Continuation of Ser. No. 603,833, Aug. 11, 1975, abandoned.

[51] Int. Cl.² .................. B60K 17/34; F16D 15/00
[52] U.S. Cl. .................................. 180/49; 74/665 T; 74/665 G; 184/11 R; 192/44
[58] Field of Search ............ 180/44 R, 49; 184/13 R, 184/13 A, 11 R; 192/35, 38, 43, 44, 45; 74/665 F, 665 G, 665 S, 665 T

[56] References Cited

U.S. PATENT DOCUMENTS

| 2,399,201 | 4/1946 | Buckendale | 74/389 |
|---|---|---|---|
| 2,699,852 | 1/1955 | Cost | 192/46 |
| 2,796,941 | 6/1957 | Hill | 180/44 R |
| 3,055,471 | 9/1962 | Warn | 192/35 X |
| 3,221,574 | 12/1965 | Sampietro | 74/665 |
| 3,295,625 | 1/1967 | Ordorica | 180/44 R |
| 3,300,002 | 1/1967 | Roper | 180/44 R |
| 3,499,503 | 3/1970 | Murray | 184/13 R |
| 3,517,573 | 6/1970 | Roper | 192/35 |
| 3,605,523 | 9/1971 | O'Brien | 74/711 |
| 3,650,349 | 3/1972 | Cleveland | 180/44 R |

FOREIGN PATENT DOCUMENTS 899,607  6/1945  France ................... 180/44 R

Primary Examiner—John P. Silverstrim
Attorney, Agent, or Firm—Julian Schachner

[57] ABSTRACT

A power transfer mechanism incorporated in a multiple path drive system comprises a transfer case disposed between a source of input torque and a pair of drive axles. Torque is transferred directly to one drive axle and is transferred automatically to the other drive axle through a double-acting roller clutch when required. The clutch is biased toward its engaged position by frictional contact between drag shoes and the case, the shoes themselves being biased toward frictional contact. Clutch bias is supplemented by the action of centrifugal force. The transfer case is constructed such that it may be assembled in two configurations; one in which the output shafts are coaxial and offset from the input shaft, and the other in which the input shaft and one output shaft are coaxial, the other output shaft being offset therefrom. Assembly in either configuration is simplified by the use of interchangeable parts to a large extent.

9 Claims, 6 Drawing Figures

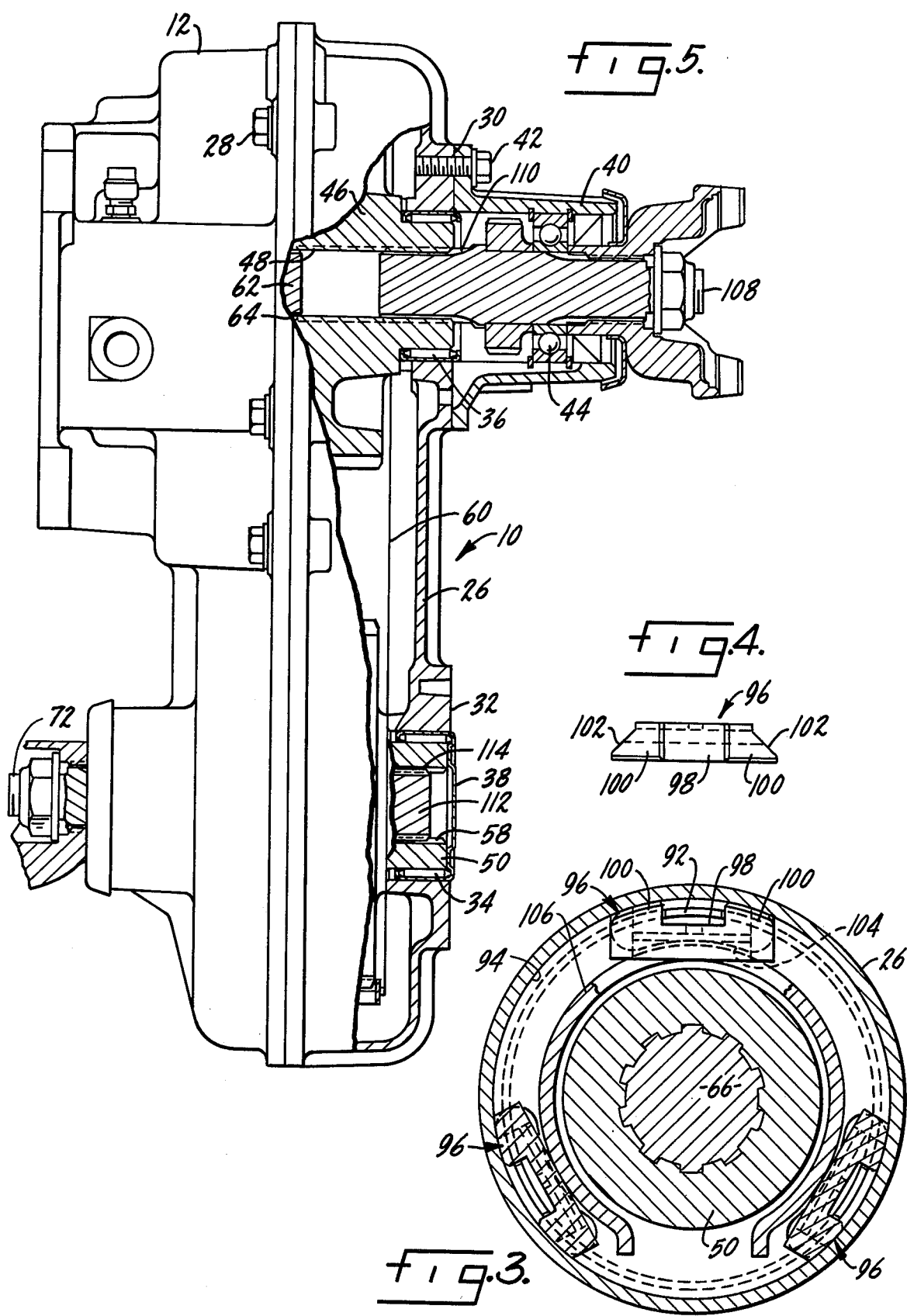

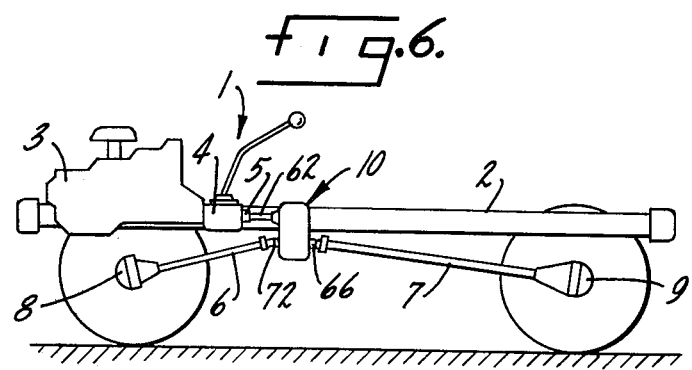

AUTOMATIC FOUR-WHEEL DRIVE TRANSFER CASE

This is a continuation, of application Ser. No. 603,833 filed Aug. 11, 1975, now abandoned.

BACKGROUND OF THE INVENTION

1. Field of the Invention

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle where two-wheel drive is adequate, and to provide torque for both drive axles automatically where four-wheel drive is required. The torque transfer case incorporates a double-acting roller clutch responsive to relative rotation between the drive axles for automatically engaging where four-wheel drive is required.

2. Description of the Prior Art

In recent years there have been many improvements in automotive drive trains, including improvements relating to the transfer of torque from a prime mover to drive axles. Where four-wheel drive systems are used, transfer cases have been developed which generally provide torque transfer to one output to drive an axle and to another output for driving another axle. Some such transfer cases generally have included a free wheel mechanism which automatically engages and disengages the four-wheel drive function. These mechanisms generally have incorporated a biasing feature wherein friction drag to ground is developed. However, this friction drag is affected adversely by centrifugal force. Separate torque transfer cases have been required for establishing each torque transfer path desired. Transfer cases have been developed for providing torque transfer from an input to one output coaxial therewith and another output offset therefrom. Other transfer cases have been developed for providing torque transfer from an input to a pair of offset outputs.

SUMMARY OF THE INVENTION

This invention is directed in brief to an improved four-wheel drive transfer case for use between a prime mover and a pair of drive axles. The mechanism includes a transfer case adaptable for transferring torque from an input to one output directly and to another output through a double-acting roller clutch. The clutch includes a roller cage which is frictionally biased by the case housing in an improved manner in order to take advantage of centrifugal force. The arrangement is such that the output connected with the front axle normally rotates faster than the output connected with the rear axle. In this condition, the clutch tends to freewheel and no power is transmitted to the front axle. If the rear wheels lose traction in either direction of rotation, the rear output shaft will speed up until it rotates at the same speed as the front output shaft. The clutch then engages due to the frictional bias, and torque is transferred to the front output to drive the front axle as well as the rear axle. When traction is restored to the rear wheels, the roller clutch disengages and the system reverts back to a conventional two-wheel drive condition.

The front output defines an outer clutch race of cylindrical configuration. An element defines an inner clutch race having a plurality of ramp surfaces, each associated with a roller carried by a roller cage. Bias for the roller cage is provided by drag shoes which rotate with the roller cage and are themselves biased toward frictional contact with the case housing both by a floating spring and by centrifugal force.

The transfer case may be constructed such that it is adaptable for transferring torque from an input to a pair of coaxial outputs offset therefrom on the one hand, and from an input to one output coaxial therewith and another output offset therefrom on the other hand. In each case the automatic engaging and disengaging feature is provided.

The adaptability of the improved transfer case is obtained easily and simply. It results from assembly in either of two configurations. In either, one of the output shafts is driven directly from the input shaft. The other is driven through an overrunning clutch. Most of the parts used in the transfer case, in either configuration, are interchangeable. Thus, the requirements of various vehicle manufacturers for four-wheel drive power trains having torque transfer paths with one configuration or the other may be easily and simply satisfied with a simplified and economical assembly, as will be described.

BRIEF DESCRIPTION OF THE DRAWING

The objects and advantages of this invention will become apparent to those skilled in the art upon careful consideration of the specification herein, including the drawings, wherein:

FIG. 3 is a sectional view taken along the line 3—3 of FIG. 1 showing details of the biasing mechanism;

FIG. 4 is a top view of the drag shoes of FIG. 3;

FIG. 5 is a sectional view, similar to FIG. 1, showing details of the torque transfer case in a second configuration thereof wherein one output shaft is coaxial with the input shaft and the other output shaft is offset therefrom; and FIG. 6 is a schematic view of the four-wheel drive vehicle.

Figure 1:
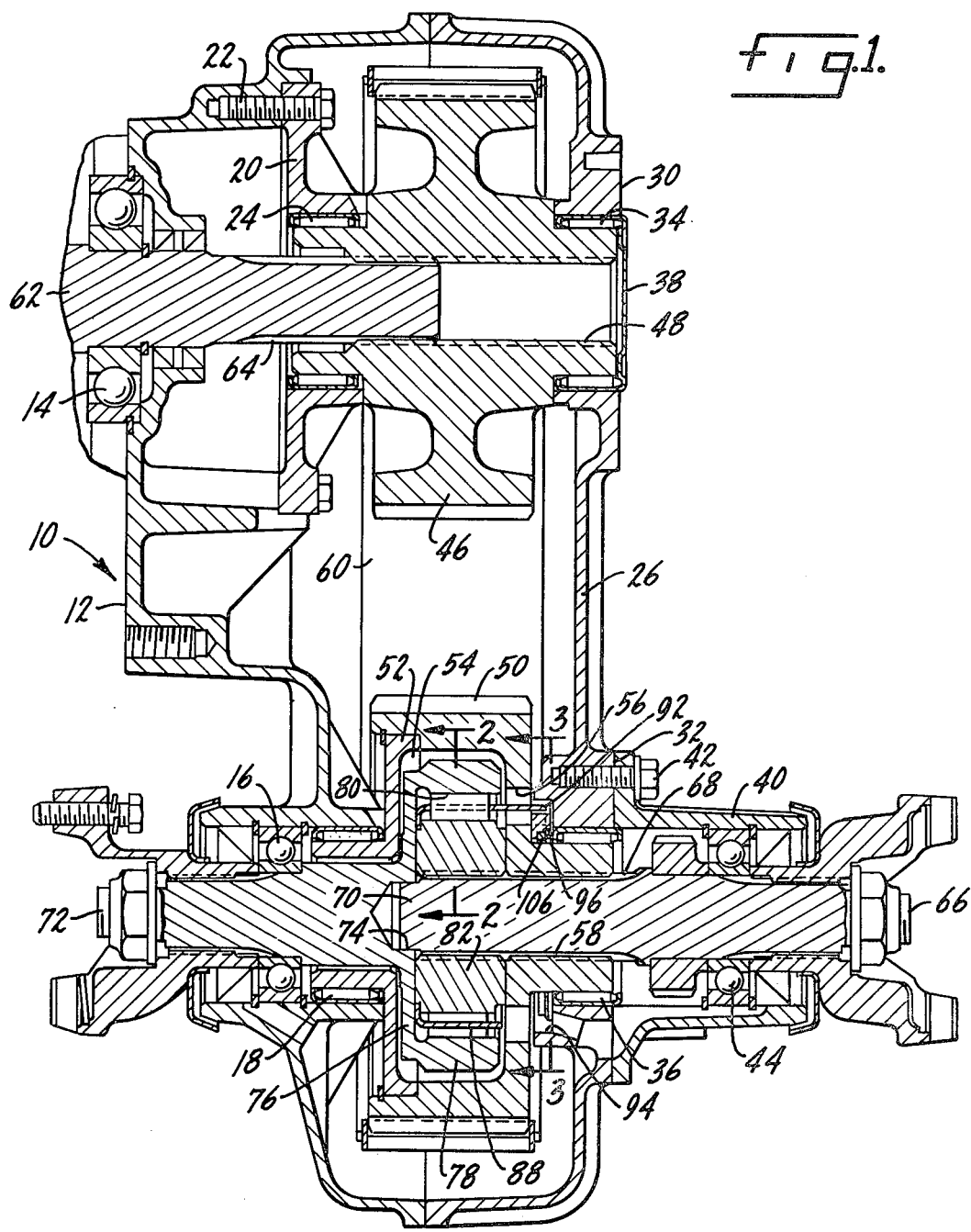
FIG. 1 is a sectional view showing details of the torque transfer case in a first configuration thereof wherein coxial output shafts are offset from the input shaft.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown a multiple path drive system in the form of a four-wheel drive vehicle 1 having a frame 2 on which is supported a prime mover 3 in driving relationship with a suitable transmission 4 having an output 5. Front and rear propeller shafts 6 and 7 respectively are in driving engagement with front and rear axle and ground-engaging wheel assemblies 8 and 9. A torque transfer case 10 is in engagement with transmission 4 for receiving torque from prime mover 3, and is in engagement with propeller shafts 6 and 7 for transmitting torque to wheel assemblies 8 and 9.

Torque transfer case 10 includes a first housing section 12 which supports bearings 14, 16 and 18. Housing section 12 includes a support member 20 rigidly secured thereto by a plurality of bolts 22 or the like. Support member 20 carries bearing 24.

Torque transfer case 10 also includes a second housing section 26 secured to housing section 12 by a plurality of bolts 28 or the like. Housing section 26 defines flat faces 30 and 32 of similar configuration. Bearings 34 and 36 are supported by housing section 26. Bearing 34 includes an end cover 38 sealing an opening in face 30.

Housing section 26 includes a sub-assembly 40 which is mated to face 32 and is secured thereto by a plurality of bolts 42 or the like. Sub-assembly 40 supports a bearing 44.

A first sprocket 46 is journalled in bearings 24 and 34. Sprocket 46 defines an interior spline 48. A second sprocket 50 includes flange 52 as a portion thereof and defines an interior pocket 54. Sprocket 50 also defines a plurality of openings 56 extending therethrough and spaced around its periphery to communicate pocket 54 with the exterior thereof. Sprocket 50 is journalled in bearings 18 and 36 and defines an interior spline 58. A suitable chain 60 couples sprockets 46 and 50. Sprocket 46, chain 60 and sprocket 50 form a chain drive train.

An input shaft 62 is journalled in bearing 14 and extends into transfer case 10. Input shaft 62 defines a spline 64 in engagement with spline 48 of sprocket 46. Input shaft 62 is adapted to receive torque, for example, from output 5 of transmission 4. It should be understood that input shaft 62 may be the output shaft of such a transmission.

A rear output shaft 66 is journalled in bearing 44 of sub-assembly 40 and extends into transfer case 10. Output shaft 66 is in driving engagement with propeller shaft 7. Output shaft 66 defines a spline 68 in engagement with spline 58 of sprocket 50. Output shaft 66 also defines an end portion 70 of reduced diameter.

A front output shaft 72 is journalled in bearing 16 and extends into transfer case 10. Output shaft 72 is in driving engagement with propeller shaft 6. Output shaft 72 defines an interior opening 74 which receives extention 70 of output shaft 66 and serves as a guide therefor. Output shaft 72 defines an upstanding flange 76 and an annular extension 78 within pocket 54 of sprocket 50. Extension 78 defines an outer roller clutch race 80 of cylindrical configuration.

An annular element 82 defines an interior spline 84 in engagement with spline 68 of output shaft 66. Element 82 is of symmetrical configuration and is within pocket 54 between flange 76 of output shaft 72 and sprocket 50. Its symmetry insures proper installation during assembly. Element 82 defines an inner roller clutch race 86 comprising a plurality of flats or ramp surfaces.

An annular roller cage 88 supports a plurality of wedging elements or rollers 90, one of which is associated with each flat of inner race 86. Extension 78, element 82, cage 88 and rollers 90 form a double-acting clutch.

Roller cage 88 defines a plurality of fingers 92 extending through openings 56 of sprocket 50 into a cylindrical channel 94 defined by housing section 26.

As best shown in FIGS. 3 and 4, a plurality of drag shoes 96 are in spaced relationship in channel 94. Each drag shoe 96 defines a transverse slot 98 in the outer surface 100 thereof, in which a finger 92 of cage 88 is carried. Each surface 100 is curved and in frictional contact with channel 94 so as to establish smooth frictional contact with housing section 26. If desired, a wear ring may be press fit in channel 94 for frictional contact by shoes 96.

Drag shoes 96 define wedge-shaped side surfaces 102 which act as deflecting blades for slinging oil through openings 56 into pocket 54 so as to provide lubrication for the clutch therein. Rotation of shoes 96 as shown in FIG. 3 corresponds to horizontal movement as shown in FIG. 4. As shoes 96 move in one direction or the other, one or the other of surfaces 102 slings oil upwardly as shown in FIG. 4, or leftwardly as shown in FIG. 1, into pocket 54.

Each shoe 96 also defines an annular groove 104 in the inner end thereof. A floating spring 106 is engaged in each groove 104 of shoes 96 so as to bias them outwardly into frictional engagement with housing section 26. Spring 106 is of horseshoe configuration and is flexed around the inner portion of sprocket 50, but is free from contact therewith. As a result, no frictional forces are developed by sprocket 50 and spring 106. In this manner, the frictional forces developed by housing section 26 and shoes 96 are the only ones acting as an external drag on roller cage 88. This drag is increased by movement of shoes 96 outwardly due to centrifugal force as their speed of rotation increases.

In the configuration shown in FIG. 1, the operation of transfer case 10 is as follows. Torque is received by input shaft 62 and is transferred through the chain drive train to drive output shaft 66. In one preferred form of the invention, output shaft 66 may be connected to a rear drive axle assembly of an associated vehicle. Output shaft 72 may be connected to the front drive axle assembly of an associated vehicle.

Output shaft 72 normally rotates faster than output shaft 66. This is inherent when the vehicle is turning, since the front wheels travel through a larger radius than do the rear wheels. For straight ahead movement, this may be accomplished by providing front and rear axles having slightly different gear ratios, front wheels slightly smaller than rear wheels, or by inflating the front tires to a pressure slightly less than that in the rear tires. Other suitable means may be provided for causing output shaft 72 normally to rotate faster than output shaft 66.

Annular extension 78 rotates with output shaft 72. Annular element 82, splined to output shaft 66, rotates therewith. Thus, outer race 80 rotates faster than inner race 86 under normal conditions. Roller cage 88 is rotated, and fingers 92 carry drag shoes 96. Due to the frictional engagement of drag shoes 96 with housing section 26, balanced radial forces are developed which result in a relative drag effect on roller cage 88. This relative drag effect is developed without any axial forces acting on roller cage 88, and thus there is no tendency for roller cage 88 to bind. As noted above, spring 106 biases drag shoes 96 into frictional contact with housing section 26. Spring 106 does not contact sprocket 50, so there is neither frictional contact nor wear between these elements. Furthermore, as friction shoes 96 rotate, centrifugal force tends to force them outwardly within channel 94, tending to increase the frictional contact with the housing section 26. Thus, the drag effect on cage 88 may be closely controlled.

Figure 2:
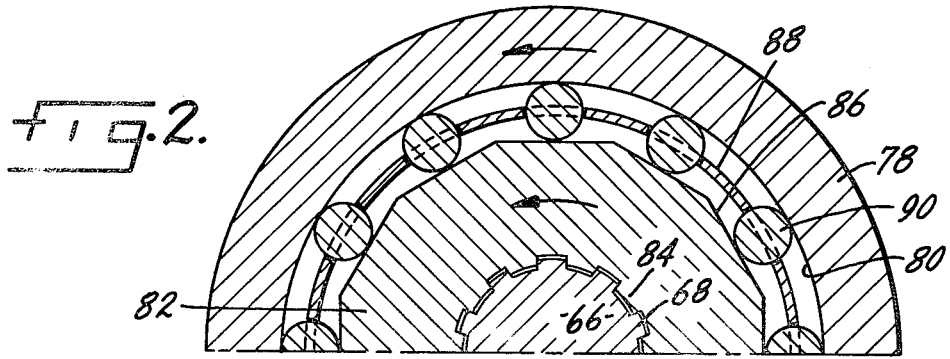
FIG. 2 is a sectional view taken along the line 2—2 of FIG. 1 showing details of the double-acting roller clutch.

With reference to FIG. 2, assume output shaft 66 and element 82 are rotating in the counterclockwise direction. Output shaft 72 and annular extension 78 also are rotating in the counterclockwise direction, but slightly faster than output shaft 66 and element 82. The drag effect on roller cage 88 causes rollers 90, in effect, to rotate relatively in the clockswise direction. Rollers 90 tend to wedge between inner race 86 and outer race 80 so as to engage the clutch. However, due to the fact that extension 78 is rotating faster than element 82, a force is developed which acts on rollers 90 such that they will be carried in the counterclockwise direction, relatively, away from their engaged position. Thus, the relative rotation between extension 78 and element 82 prevents engagement of the clutch. As a result, torque is transferred to output shaft 66 but not to output shaft 72. In this condition, the operation is essentially that of a conventional two-wheel drive vehicle.

If the rear wheels lose traction, output shaft 66 will speed up until it is rotating at the same speed as is output shaft 72. The drag effect on roller cage 88 will cause rollers 90 to wedge between inner race 86 and outer race 80 when output shafts 66 and 72 are rotating at the same speed. When this takes place, torque will be transferred both to output shaft 66 and through the clutch to output shaft 72. In this condition, the operation is essentially that of a conventional four-wheel drive vehicle in locked-up mode.

When the rear wheel regain traction, output shaft 66 will again rotate slower than output shaft 72, and rollers 90 will be carried away from their engaged position toward a freewheeling position, thereby disengaging the clutch and restoring the vehicle to the two-wheel drive condition. Thus, it will be seen that the transfer case provides for establishment of four-wheel drive automatically as required, and for establishment of two-wheel drive automatically when four-wheel drive is not required. This automatic engaging and disengaging feature is provided when the vehicle is moving in either the forward or reverse directions; that is, when output shafts 66 and 72 are rotating in either the clockwise or counterclockwise directions as shown in FIG. 2.

Turning now to the configuration shown in FIG. 5, torque transfer case 10 may be assembled so as to provide one output shaft coaxial with the input shaft and another output shaft on an axis offset therefrom Subassembly 40 is mated to face 30 of housing section 26 and secured thereto by a plurality of bolts 42 or the like. A rear output or propeller shaft 108, similar to but shorter than output shaft 66, is journalled in bearing 44. Output shaft 108 defines a spline 110 in engagement with spline 48 of sprocket 46.

A stub shaft 112 defines a spline 114 in engagement with spline 58 of sprocket 50. Splines 84 and 114 are also engaged as hereinabove described, such that element 82 is supported by stub shaft 112 for rotation therewith. Bearings 34 and 36 are interchanged so that end cover 38 seals the opening defined in face 32 of housing section 26. This is all that is required to complete modification of the torque transfer case. In all other respects the configuration of FIG. 5 is as shown in FIG. 1.

In the configuration shown in FIG. 5, torque is transferred from input shaft 62 through sprocket 46 to output shaft 108. Torque also is transferred through the chain drive train and stub shaft 112 to element 82. Operation of the clutch is the same as in the configuration shown in FIG. 1, and torque will not be transferred to output shaft 72 until output shaft 108 speeds up so as to rotate at the same speed as output shaft 72. At this time, the clutch will engage automatically, as hereinabove described.

It should be noted that operation of the transfer case will be the same when the vehicle is moving in either the forward or rearward directions; that is, with rotation of shafts 108 and 72 in the clockwise or counterclockwise directions.

The simplicity of this mechanism is apparent. It will be seen that a transfer case has been provided which normally drives one output shaft to provide conventional two-wheel drive of an associated vehicle. When required, a double-acting roller clutch engages automatically to provide drive to both output shafts so as to establish four-wheel drive. When four-wheel drive is no longer required, the clutch automatically disengages and the system reverts to conventional two-wheel drive.

The roller cage is frictionally biased to ground in such a manner as to develop controlled, balanced radial drag forces, but no axial biasing forces which could cause binding of the clutch elements. The frictional biasing is provided by a floating spring which urges friction shoes into contact with the housing to develop the balanced radial biasing forces. In addition, centrifugal force acting upon the friction shoes also urges them into frictional engagement with the housing.

The transfer case is such that it may be assembled in either of two configurations. In one configuration the input is on one axis and a air of outputs are on another axis offset from the input axis. In another configuration the input and one output are on one axis and the other output is on another axis offset therefrom. Assembly in either configuration is simple, as most of the parts are interchangeable. If it is desired to use interchangeable parts throughout, the torque transfer case could be designed to incorporate stub shaft 112 and output shaft 108 in the configuration shown in FIG. 1 as well as that of FIG. 5. Stub shaft 112 would be splined to sprocket 50 and element 82. Output shaft 108 would be splined to sprocket 50.

It is anticipated that in either configuration high speed-low torque or low speed-high torque drives may be established when suitable reduction gearing is provided.

It should be understood that while a preferred embodiment of the invention has been shown and described, this is illustrative and may be modified by those skilled in the art without departing from the scope thereof, which is to limited only by the claims herein.

I claim:

1. In a torque transfer assembly including a housing, an input shaft rotatably supported by said housing, first and second output shafts rotatably supported by said housing, and means coupling said input shaft with said output shafts for transfer of torque thereto; the improvement wherein said coupling means comprises an overrunning clutch having a first element rotatable with said first output shaft and defining a first clutch race, a second element rotatable with said second output shaft and defining a second clutch race, wedging means between said clutch races and movable between a clutch engaging position wherein torque is transferred to said second output shaft and a clutch disengaging position wherein torque is not transferred to said second output shaft, and means biasing said wedging means toward said clutch enganging position, said biasing means including friction means movable with said wedging means, and resilient means biasing said friction means toward frictional engagement with said housing for effecting said biasing of said wedging means toward said clutch engaging position, said friction means also being biased toward frictional engagement with said housing by centrifugal force.

2. The invention of claim 1, said friction means including a plurality of friction shoes spaced around one of said output shafts, and said resilient means being a spring spaced from said one output shaft and biasing said friction shos outwardly away from said one output shaft toward said frictional engagement with said housing.

3. The invention of claim 2, said spring being of at least partial annular configuration around and spaced from said one output shaft, and said friction shoes defining grooves in the inner ends thereof, said spring engaging said friction shoes in said grooves.

4. The invention of claim 3, said housing defining an annular channel, and said friction shoes defining curved outer end surfaces for smooth frictional engagement with said housing in said channel.

5. The invention of claim 4, said firction shoes defining at least one wedged-shaped side for slinging lubricant toward said clutch.

6. The invention of claim 2, said one shaft being said first output shaft.

7. For use in a four-wheel drive vehicle having a transfer case for transferring rotary motion from a source of power to front and rear pairs of traction wheels, said transfer case including a housing, an input shaft and front and rear output shafts supporting by said housing, and means in said housing for transferring rotary motion from said input shaft to said output shafts, said means coupling said input shaft with one of said output shafts and including a clutch coupled with the other of said output shafts; the improvement wherein said clutch comprises first and second elements respectively rotatable with said one and other output shafts and defining first and second clutch races, a roller cage, a plurality of rollers carried by said cage between said clutch races and movable between clutch engaging and disengaging positions, and means frictionally engaging said cage with said housing for biasing said rollers toward said clutch engaging position, rotation of said other output shaft faster than said one output shaft tending relatively to move said rollers toward said disengaging position, said biasing means including a plurality of friction shoes carried by said cage, and resilient means solely in contact with said shoes and biasing them toward frictional contact with said housing, said shoes also being biased toward frictional contact with said housing by centrifugal force.

8. In power transmission apparatus especially adapted for driving a motor vehicle having first and second ground engaging wheels, said apparatus including a rotary input member adapted for connection to a source of power and rotary output means adapted for connection to said ground engaging wheels, said rotary output means including a pair of spaced primary rotary members coupled to each other for synchronous rotation and providing a driving connection for said first wheels, and an auxiliary rotary member providing a driving connection for said second wheels; the improvement wherein said auxiliary member is coupled to one of said primary members by means of a clutch arranged to permit overrunning of said auxiliary member with respect to said one primary member and to prevent overrunning of said one primary member with respect to said auxiliary member, said clutch including biasing means tending to condition said clutch to prevent said overrunning, centrifugal force increasing said tendency as the speed of rotation increases.

9. Power transmission apparatus comprising a housing, a clutch including first and second elements respectively rotatablewith said first and second shafts, a cage supporting wedging means between said elements and movable between clutch engaging and disengaging positions, and means for establishing frictional engagement of said cage with said housing for urging said cage toward said clutch engaging position, said urging means including friction means movable with said cage, and spring means biasing said firction means toward frictional contact with said housing, said friction means being further biased toward frictional contact with said housing by centrifugal force.

* * * * *

UNITED STATES PATENT OFFICE
CERTIFICATE OF CORRECTION

PATENT NO. : 4,119,168
DATED : October 10, 1978
INVENTOR(S) : MARK JOHN FOGELBERG It is certified that error appears in the above—identified patent and that said Letters Patent are hereby corrected as shown below:

Column 1, line 30, cancel "free wheel" and insert -- freewheel --

Column 1, line 36, the word "Separate" begins a new paragraph.

Column 6, line 27, cancel "air" and insert -- pair --.

Column 8, line 30, after "ing," insert -- first and second shafts supported for rotation in said housing, --.

Column 8, line 31, cancel "rotatablewith" and insert -- rotatable with --.

Column 8, line 38, cancel "firction" and insert -- friction --.

Signed and Sealed this

Eighteenth Day of September 1979

[SEAL]

Attest:

LUTRELLE F. PARKER
Attesting Officer    Acting Commissioner of Patents and Trademarks